W. L. SMITH.
STEAM ENGINE VALVE GEAR.
APPLICATION FILED JUNE 29, 1915.
1,217,648.
Patented Feb. 27, 1917.
3 SHEETS—SHEET 2.
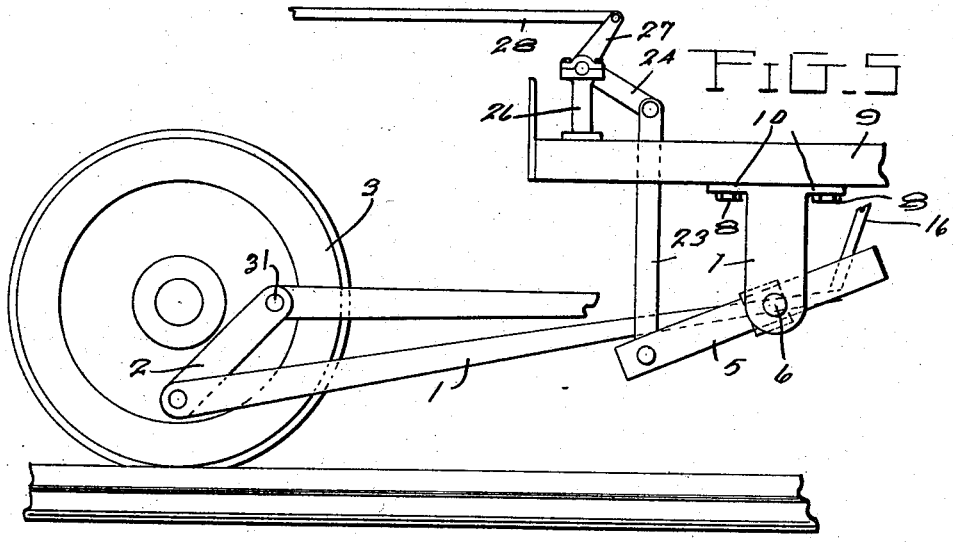
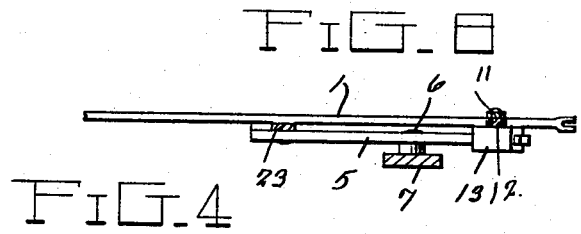
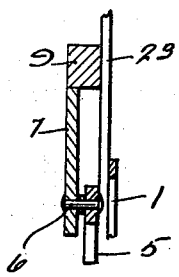
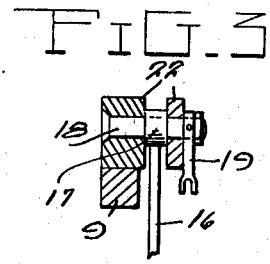
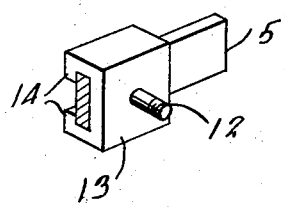
Witnesses
Chas. H. Trotter
H. J. Riley
Inventor
Wm. L. Smith
By
Attorney

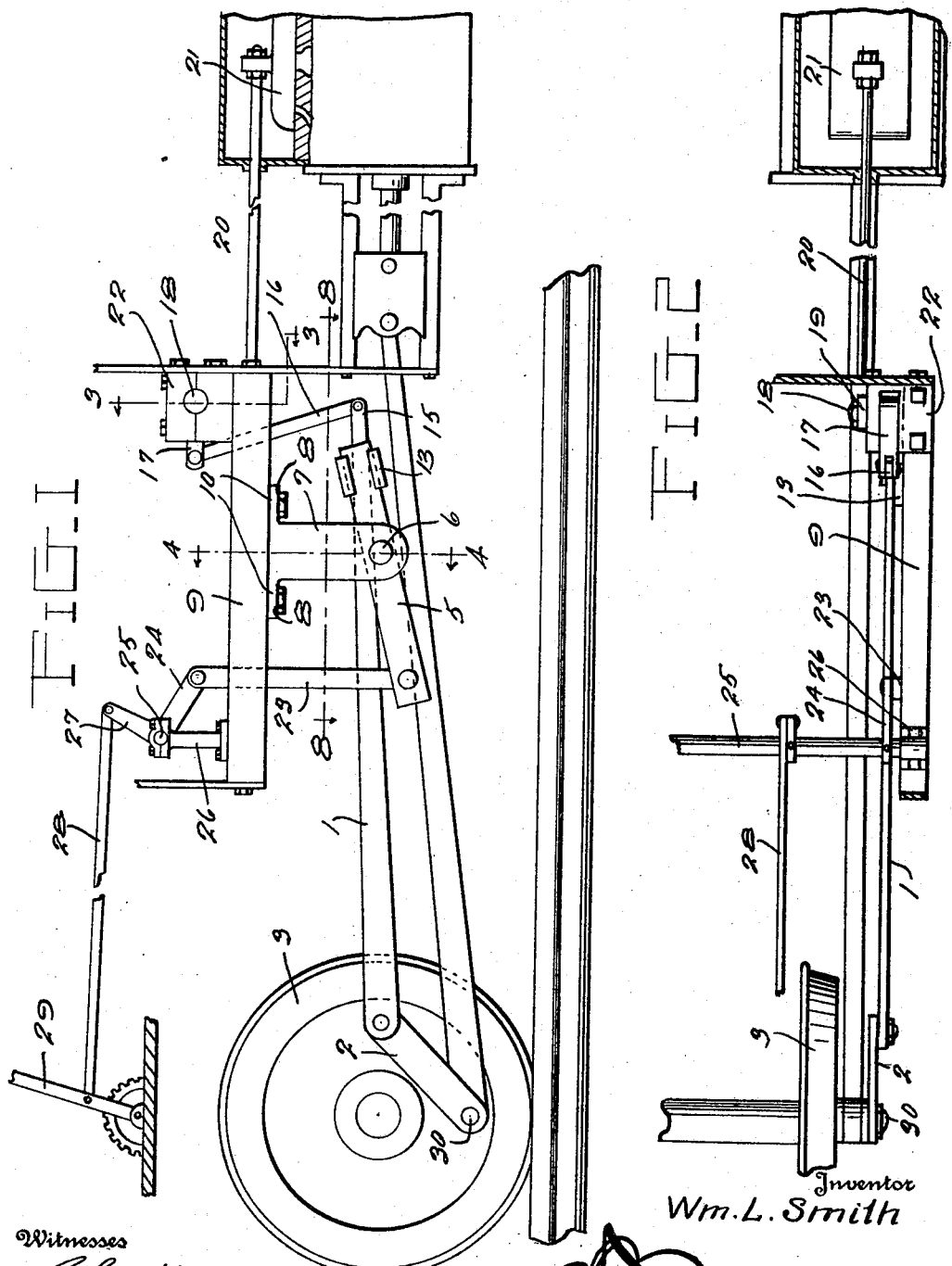

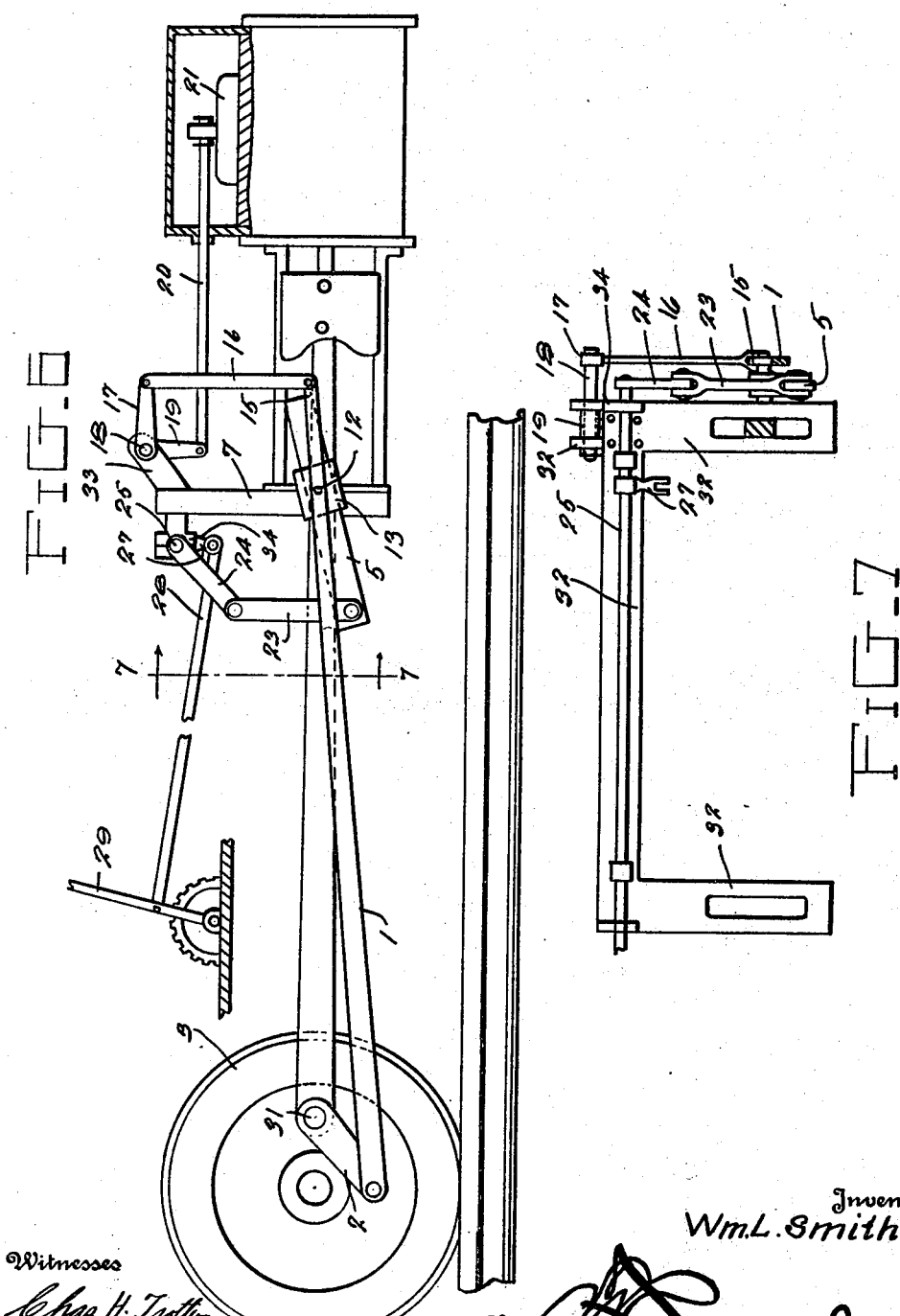

UNITED STATES PATENT OFFICE.

WILLIAM L. SMITH, OF TUSCUMBIA, ALABAMA.

STEAM-ENGINE VALVE-GEAR.

1,217,648.  Specification of Letters Patent.  Patented Feb. 27, 1917.

Application filed June 29, 1915. Serial No. 37,003.

*To all whom it may concern:*

Be it known that I, WILLIAM L. SMITH, a citizen of the United States, residing at Tuscumbia, in the county of Colbert and State of Alabama, have invented certain new and useful Improvements in Steam-Engine Valve-Gears; and I do hereby declare the following to be a full, clear, and exact description of the invention, such as will enable others skilled in the art to which it appertains to make and use the same.

The invention relates to improvements in valve gear for steam engines.

The object of the present invention is to improve the construction of valve gear for steam engines more especially the mechanism for transmitting motion from an auxiliary crank on the drive wheel of a steam locomotive to the distributing valve which admits steam to the cylinder and to provide an easily accessible outside valve gear of simple and exceedingly inexpensive construction adapted to be readily applied to a locomotive and capable of affording a perfect distribution of steam.

A further object of the invention is to provide a valve gear of this character, the upkeep of which will be much less expensive than the valve gear in use at the present time.

The invention also has for its object to cheapen the installation of the valve gear by enabling the same to be mounted on the transverse guide yoke which is a part of the present equipment of an ordinary locomotive, thereby dispensing with a separate bearing frame or valve gear supporting frame ordinarily provided with valve gear for mounting the same on the frame of an engine.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings

Figure 1 is a side elevation of a portion of a locomotive provided with a valve gear constructed in accordance with this invention, Fig. 2 is a plan view of the same, Fig. 3 is a transverse sectional view on the line 3—3 of Fig. 1, Fig. 4 is a similar view on the line 4—4 of Fig. 1, Fig. 5 is an elevation showing the auxiliary crank located in advance of the main crank, Fig. 6 is a side elevation illustrating the arrangement of the valve gear when the same is mounted on the guide yoke of a locomotive, Fig. 7 is transverse sectional view of the same.

Fig. 8 is a detail horizontal sectional view illustrating the arrangment of the pivoted guide bar, Fig. 9 is a detail sectional view showing the slidable block.

Like numerals of reference designate corresponding parts in all the figures of the drawings.

In the accompanying drawings in which is illustrated the preferred embodiment of the invention, 1 designates an auxiliary pitman or eccentric rod pivoted at its rear end to an auxiliary crank 2 of a main drive wheel 3 and having its front portion slidably supported by an adjustable guide 5. The adjustable guide 5 which consists of a bar or member having straight upper and lower edges is pivoted at an intermediate point by a pin 6 or suitable fastening device to a depending hanger 7 which is adjustably secured by bolts 8 or other suitable fastening devices to a main frame 9.

The hanger or bracket 7 is located beneath the main frame and the pivotally mounted guide extends in advance and in rear of the hanger. The hanger is provided at the top with horizontally projecting attaching portions 10 through which the bolts 8 pass and the front portion of the auxiliary pitman or eccentric rod is provided with a perforation 11 in which is arranged a pivot pin 12 carried by a slide 13 which is movable backwardly and forwardly around the guide or member 5 when the valve gear is in motion. The slide 13 consists of a block provided at its upper and lower edges with approximately L-shaped flanges 14 forming grooves or ways and embracing the upper and lower edges of the adjustable guide or member 5 but the front portion of the eccentric or auxiliary pitman rod may be slidably connected with the guide in any other suitable manner.

The front end 15 of the auxiliary pitman or eccentric rod is connected to the lower end of a link 16 which is connected at its upper end to an approximately horizontal rocker arm 17 fixed to one end of a rock shaft 18, which also has a depending arm 19 that is connected to the rear end of a valve rod 20. When the drive wheel rotates motion is communicated from the auxiliary crank 2 to the distributing valve 21 which is connected with the front end of the valve rod 20 and the valve motion is governed by the adjustment of the pivoted guide or member which is adapted to be arranged at different angles or inclinations and which is also capable of being shifted to a position at opposite sides of the horizontal plane of the pivot or fulcrum of the guide or member 5 for reversing the engine.

The shaft 18 is journaled in a suitable bearing 22 and the rear end of the adjustable guide or member 5 is connected by a link 23 with an arm 24 of a transverse rock shaft 25. The link 23 extends upwardly from the guide or member 5 and the transverse rock shaft which in practice will extend across the locomotive is mounted in a suitable bearing 26 which is secured to and extends upward from the rear end of the main frame 9. The transverse shaft 25 is provided with an upwardly extending arm 27 which is connected by a reach rod 28 with a reversing lever 29 designed to be located in the cab of the locomotive and to be constructed in the usual manner for operating the valve gear.

The auxiliary crank 2 which is rigid with the main crank is arranged on the quarter or ninety degrees and is in rear of the main crank 30 but the auxiliary crank may be arranged in advance of the main crank as shown at 31 in Fig. 5 of the drawings. Also, while it is preferable to connect the auxiliary pitman or eccentric rod with the auxiliary crank, any other suitable crank or eccentric element may of course be employed for actuating the valve gear.

In Figs. 6 and 7 of the drawings is illustrated a modification of the invention, in which the valve gear is mounted on the transverse guide yoke 32 of an ordinary engine equipment in order to simplify the construction and lessen the cost of installation. The guide yoke supports at each end a forwardly projecting bearing bracket 33 and a rearwardly projecting bracket 34 and these brackets which are bolted or otherwise secured to the transverse guide yoke have mounted in them the shafts 18 and 25. The front bearing bracket which is approximately U-shaped is composed of spaced sides and a transverse attaching portion which is pierced by the fastening devices for securing of the front bearing bracket to the guide yoke. The sides of the front bracket are arranged in parallelism and are preferably set at an inclination as shown and are provided at their front portions with transversely alined bearings in which the shaft 18 is mounted. The rearwardly extending bracket 34 is preferably arranged in a horizontal position and its terminal portions are preferably enlarged as shown.

What is claimed is:—

1. A valve gear including an adjustable guide, a reciprocatory support slidable along the guide, an auxiliary pitman or eccentric rod pivotally connected at its front portion with and reciprocating the said support, means connected with the rear end of the auxiliary pitman or eccentric rod for actuating the same, mechanism connected with the front end of the auxiliary pitman or eccentric rod for connecting the same with the valve, and a reversing lever connected with the guide for adjusting the same.

2. A valve gear including a pivotally mounted adjustable guide, a reciprocatory support slidable along the guide, an auxiliary pitman or eccentric rod pivoted at its front portion to and reciprocating the support, a driving wheel having an auxiliary crank connected to the rear end of the auxiliary pitman or eccentric rod, means for transmitting motion from the front end of the auxiliary pitman or eccentric rod to a valve, and a reversing lever connected with the pivotally mounted guide for adjusting the same.

3. A valve gear including a pivotally mounted adjustable guide, a reciprocatory support slidable along the guide, an auxiliary pitman or eccentric rod pivoted at its front portion to the support and reciprocating the same, a driving wheel having an auxiliary crank connected to the rear end of the auxiliary pitman or eccentric rod, a reversing lever, means for connecting the same with the adjustable guide, and mechanism for transmitting motion from the auxiliary pitman or eccentric rod to a valve.

4. A valve gear including a guide, means for pivotally mounting the same, a reciprocating slide mounted on and movable along the guide, an auxiliary piston or eccentric rod pivoted to and supported at one end by the said slide and reciprocating the same, means for actuating the auxiliary pitman or eccentric rod, mechanism for transmitting motion from the same to a valve, and a reversing lever connected with the guide for adjusting the same.

5. A valve gear including a guide bar pivoted intermediate of its ends, a reciprocatory block slidable along the guide bar and provided with a pivot, an auxiliary pitman or eccentric rod connected at one end to the said block, means for actuating the auxiliary pitman or connecting rod, mechanism for transmitting motion from the auxiliary pitman or eccentric rod to a valve, and a reversing lever connected with the guide bar for adjusting the same.

6. A valve gear including a frame, a hanger secured to and depending from the frame, a guide bar pivotally mounted on the hanger, a slide reciprocating on the guide bar, an auxiliary pitman or eccentric rod pivoted to the slide and reciprocating the same, mechanism carried by the frame and connected with the auxiliary pitman or eccentric rod for actuating a valve, a shaft also supported by the said frame and having an arm connected with the guide bar, and a reversing lever connected with the shaft for partially rotating the shaft to adjust the guide bar.

In testimony whereof I affix my signature in presence of two witnesses.

WILLIAM L. SMITH.

Witnesses:
W. E. AYCOCK,
Z. T. JACOBS.

Copies of this patent may be obtained for five cents each, by addressing the "Commissioner of Patents, Washington, D. C."